United States Patent [19]

Ichimura et al.

[11] Patent Number: 5,161,022
[45] Date of Patent: Nov. 3, 1992

[54] DC-DC CONVERTER FOR VIDEO APPARATUS

[75] Inventors: Hiroshi Ichimura, Yokohama; Ikumi Minema, Funabashi; Wataru Katase, Yokohama, all of Japan

[73] Assignee: Victor Company of Japan, Ltd., Yokohama, Japan

[21] Appl. No.: 698,210

[22] Filed: May 10, 1991

[30] Foreign Application Priority Data

May 15, 1990 [JP] Japan ............................. 2-50811[U]

[51] Int. Cl.$^5$ .......................... H04N 3/18; H04N 5/63
[52] U.S. Cl. ................................................ 358/190
[58] Field of Search ................. 358/190, 188, 148, 149

[56] References Cited

U.S. PATENT DOCUMENTS

| 4,516,169 | 5/1985 | Truskalo | 358/190 |
|---|---|---|---|
| 4,891,707 | 1/1990 | Dieterle | 358/190 |
| 4,994,719 | 2/1991 | Lendaro | 358/190 |

FOREIGN PATENT DOCUMENTS

| 32262 | 2/1984 | Japan | 358/190 |
|---|---|---|---|
| 2124816 | 2/1984 | United Kingdom | 358/190 |

OTHER PUBLICATIONS

Wide-Range and High Efficiency Switching Power Supply for Color TV Receivers, by Toshio Fujimura, et al., IEEE Transactions on Consumer Electronics vol. CE-24, No. 3 Aug., 1978, pp. 473 to 479.

Patent Abstracts of Japan, vol. 91, No. 65 (E-327), Jul. 10, 1985 and JP-60 041372 (Matsushita) Mar. 5, 1985.
Patent Abstracts of Japan, vol. 125, No. 98 (E-698), Dec. 24, 1988 and JP-63 208384 (Matsushita) Aug. 29, 1988.

Primary Examiner—Tommy P. Chin
Attorney, Agent, or Firm—Lowe, Price, LeBlanc & Becker

[57] ABSTRACT

A dc-dc converter for converting first to second dc voltages, used for video apparatus, comprising: a self-excited oscillation circuit for producing a clock signal, the self-excited oscillation circuit having a control input for controlling oscillation thereof in response to a control signal; a pulse width modulation circuit responsive to the clock signal and the second dc voltage for controlling duty ratio of the clock signal; a switching circuit responsive the pulse-width-modulated clock signal for switching the first dc voltage; rectifying and smoothing circuit for rectifying and then smoothing an output of the switching circuit to produce the second dc voltage; and a control circuit responsive to a vertical synchronizing signal of a video signal used in the video apparatus for producing the control signal whose pulse width is sufficiently shorter than a vertical retrace period of the vertical synchronizing signal. Oscillation of the self-excited circuit is controlled in response to the vertical synchronizing signal to prevent switching noise of the dc-dc converter from disturbing the reproduced image.

3 Claims, 3 Drawing Sheets

DC-DC CONVERTER FOR VIDEO APPARATUS

BACKGROUND OF THE INVENTION

1. Field of the Invention

This invention relates to a dc-dc converter for a video apparatus such as a portable video camera.

2. Description of the Prior Art

A dc-dc converter is used in a portable apparatus such as a video camera to obtain a higher voltage necessary for the portable apparatus from a relatively low voltage power supply, such as a battery. Moreover, in the stationary type apparatus such as VTR, a dc-dc converter is used in a switching regulator for producing a necessary dc voltage after converting an ac voltage from a commercial power supply to a dc voltage in order to miniaturize a power supply unit and reduce the weight of the power supply unit.

FIG. 4 is a block diagram of a prior art dc-dc converter.

In the prior art dc-dc converter 100, a self-excited oscillation circuit 101 produces and sends a square wave signal 102 to a clock input terminal 103a of a pulse width modulation circuit 103. The pulse width modulation circuit 103 produces a pulse width modulation signal 105 whose duty ration is changed but whose cycle is maintained, in accordance with a control voltage 104 applied to a duty control terminal 103b. The pulse width modulation signal 105 causes switching of a power FET or a transistor in the drive circuit 106 to start and stop a current flow in the primary circuit of the transformer 107. An output of a secondary circuit of the transformer 107 is sent to a rectifying and smoothing circuit 108 for obtaining a dc voltage output 109.

The dc voltage output 109 is fed back to the above-mentioned voltage control terminal 103b directly. Alternatively, a voltage corresponding to the dc voltage output 109 is fed back to the voltage control terminal 103b indirectly to stabilize the dc voltage output 109. That is the dc voltage output 109 is sent to the control terminal 103b after voltage-dividing.

In such prior art dc-dc converter, there is a problem that if noise developed by switching is imposed upon a video signal, the noise affects the reproduced image. If the occurrences of the noise synchronizes with the horizontal scanning signal, a vertical stripe pattern occurs on the reproduced image.

Moreover, another type dc converter is known. That is, a control input terminal 101a for stopping oscillation is provided in the self-excited oscillation circuit 101. Its power consumption is reduced by stopping of dc-dc converting by controlling of a logic level of an oscillation control signal 110 applied to the control input terminal 102a when the apparatus is in the waiting state.

However, the prior art dc-dc converter 100 shows a low stability because it uses an LC type or CR type self-excited oscillating circuit 101 to make the structure simple and reduce its cost. Moreover, the square wave signal 102 of the self-excited oscillation circuit 101 is not synchronized with a vertical synchronizing signal of the video signal system. Therefore, there is a problem of beat occurring on a reproduced image due to noise developed by switching because the effects of such noise cannot removed totally even though oscillation frequency of the self-excited oscillation circuit 101 is adjusted.

In order to resolve such problems, this invention is provided to reduce the beat trouble associated with switching noise caused by a dc-dc converter with a simple structure if an oscillating circuit having a relatively low stability.

SUMMARY OF THE INVENTION

The present invention has been developed in order to remove the above-described drawbacks inherent to the conventional dc-dc converter.

According to the present invention there is provided a dc-dc converter for converting first to second dc voltages, used for video apparatus, comprising: a self-excited oscillation circuit for producing a clock signal, the self-excited oscillation circuit having a control input for controlling oscillation thereof in response to a control signal; a pulse width modulation circuit responsive to the clock signal and the second dc voltage for controlling duty ratio of the clock signal; a switching circuit responsive the pulse-width-modulated clock signal for switching the first dc voltage; rectifying and smoothing circuit for rectifying and then smoothing an output of the switching circuit to produce the second dc voltage; and a control circuit responsive to a vertical synchronizing signal of a video signal used in the video apparatus for producing the control signal whose pulse width is sufficiently shorter than a vertical retrace period of the vertical synchronizing signal. Oscillation of the self-excited circuit is controlled in response to the vertical synchronizing signal to prevent switching noise of the dc-dc converter from disturbing the reproduced image.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

In consideration of the above-mentioned problems, the following type of a dc-dc converter was tried. That is, the oscillation of the self-excited oscillation circuit was stopped in response to the vertical synchronizing signal for controlling of the oscillation. As a result, the beat trouble on the reproduced image was reduced considerably. However, in this type dc-dc converter, ripple level of dc voltage output of the dc-dc converter increased because an interval of the stopping of the oscillation was too long, so that a sound noise like a hum noise was superimposed on the reproduced sound of the audio signal. Therefore, another problem associated with unstableness of the supply voltage occurred.

In consideration of this problem, another type of a dc-dc converter was tried. That is, the oscillation of the self-excited circuit 101 was stopped asynchronously with the vertical synchronizing signal. As a result, the ripple decreased and the problem associated with the unstableness of the supply voltage did not occur. However, the beat trouble was not reduced. This invention is developed in consideration of the above-mentioned trials and problems also.

Hereinbelow will be described an embodiment of this invention.

Figure 1:
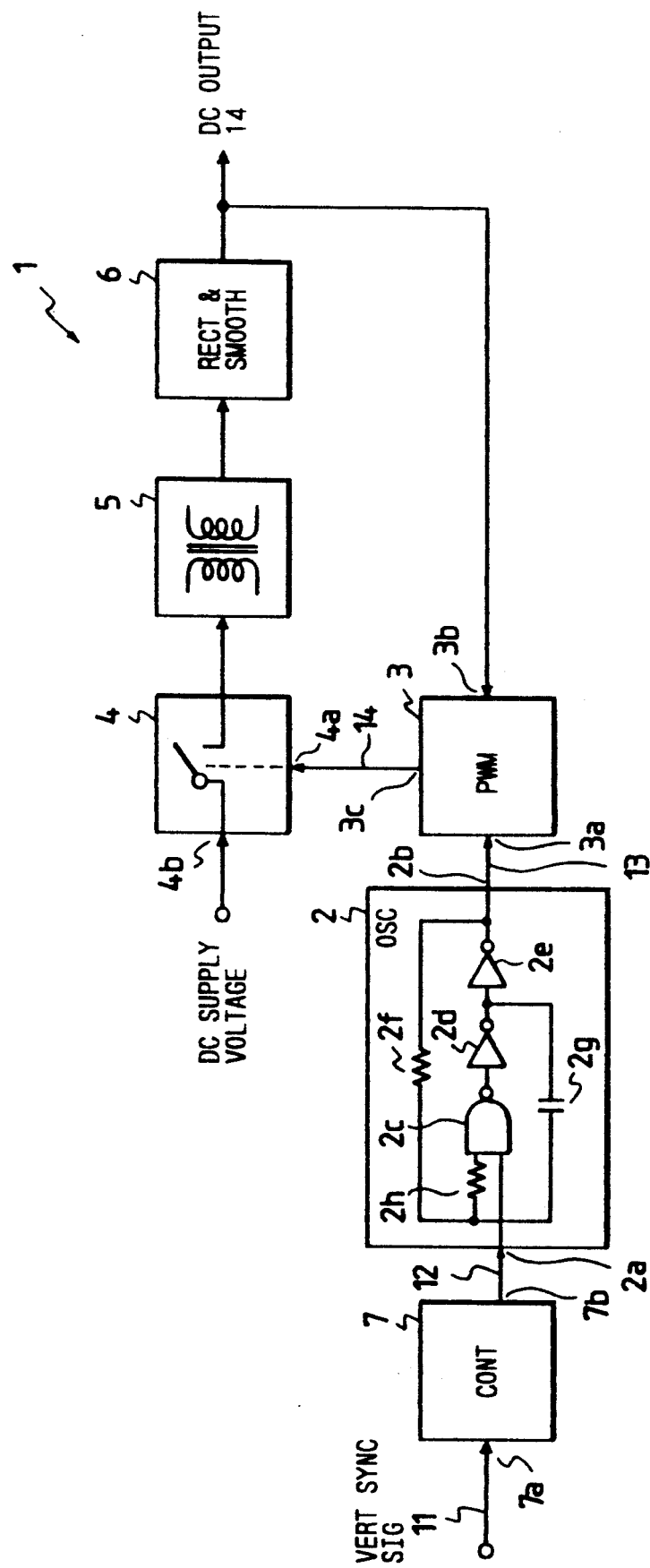
FIG. 1 is a block diagram of an embodiment of the invention of a dc-dc converter.

FIG. 1 is a block diagram of the embodiment of the invention of a dc-dc converter.

The dc-dc converter 1 comprises a self-excited oscillation circuit 2 (hereinbelow referred to as an oscillation circuit) with a control input for stopping oscillation, a pulse width modulation circuit 3, and a switching circuit 4, and a transformer 5, and a rectifying and smoothing circuit 6 and a control circuit 7.

The oscillation circuit 2 stops its oscillation when a level of the oscillation stop input 2a is L (low level) and outputs a square wave signal 13 with a given frequency and given duty ratio at an output 2b by oscillation when the oscillation stop input 2a is H (high level). The oscillation circuit 2 comprises a NAND gate 2c, an astable multivibrator including inverters 2d and 2e connected to the NAND gate 2c in series, a resistor 2f and a capacitor 2g for determining the oscillation frequency, and an input protection resistor 2h. A frequency of the square wave signal 13 is set to about 480 KHz to have an interleave relation with the horizontal scanning frequency of the video signal.

The pulse width modulation circuit 3 generates a pulse width modulated signal 14 with interval of the square wave signal 13 maintained but duty ratio changed in accordance with the control signal, i.e., the dc output 14. In this pulse width modulation circuit 3, the higher control voltage, the shorter interval of H level of the pulse modulation signal 14.

A switching circuit 4 switches and sends a dc supply voltage applied to its input 4b to a primary circuit of the transformer 5 only when a level of the pulse width modulation signal 14 applied to the control input 4a is H. The switching circuit 4 comprises a switching element such as a power FET or a transistors and the like. The switch circuit 4 supplies an intermittent current to the primary circuit of the transformer 5, so that the transformer 5 develops another voltage at its secondary circuit. The output voltage of the secondary circuit is applied to the rectifying and smoothing circuit 6 to produce a dc voltage output 14. Further, the dc voltage output 14 is stabilized by feed back of the output voltage directly or another control signal obtained by dividing the dc voltage output 14, which is fed to a duty control input 3b of the pulse width modulation circuit 3.

The control circuit 7 produced an oscillation stop signal 12 having a given pulse width of L level (for, example, several microseconds) at a given timing in response to a trigger signal applied to a trigger input 7a. In this embodiment, the vertial synchronizing signal 11 of the video signal is applied to the trigger input 7a as a trigger signal. The control circuit 7 produces the oscillation stop signal 12 of L level whose width is sufficiently shorter than the vertical retrace line interval in response to rising and falling edges of the vertical synchronizing signal 11 to output it at an output terminal 7b.

Figure 2:
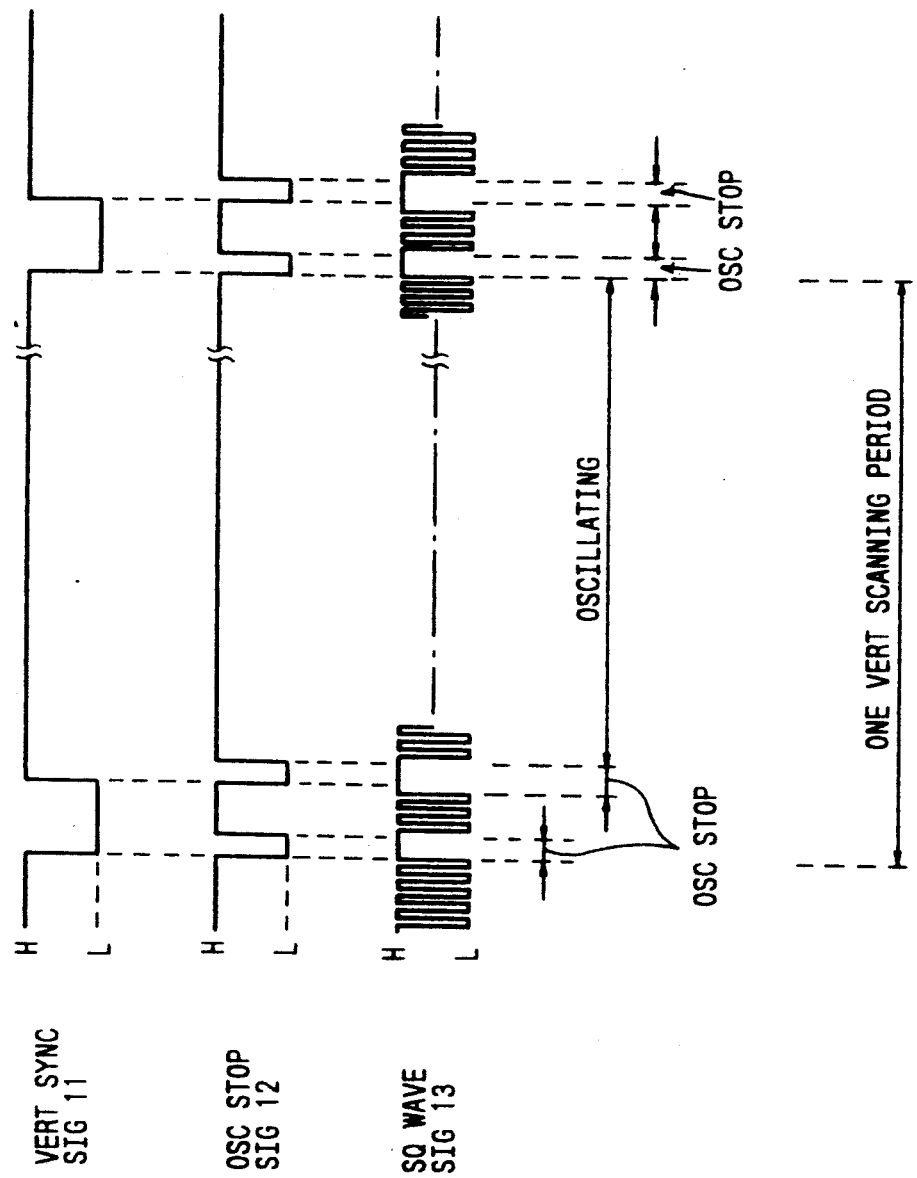
FIG. 2 shows a time chart for illustrating operation of the first embodiment.
Figure 3:
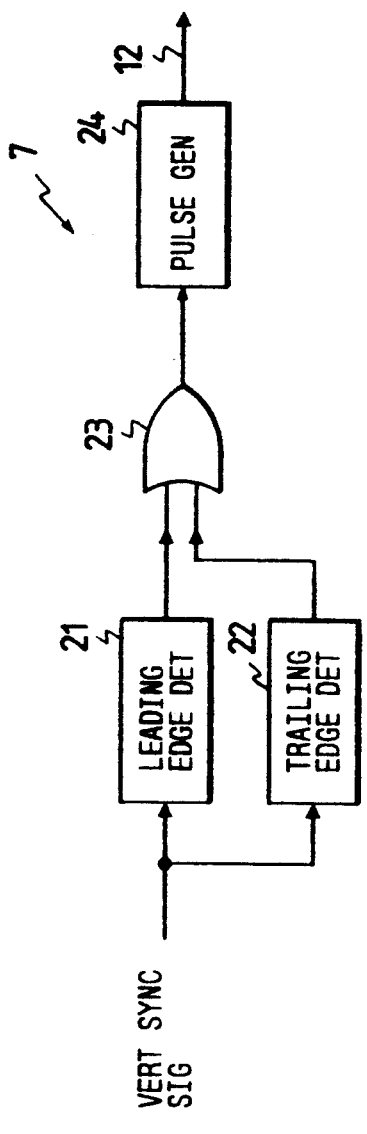
FIG. 3 is a block diagram of the control circuit shown in FIG. 1.
Figure 4:
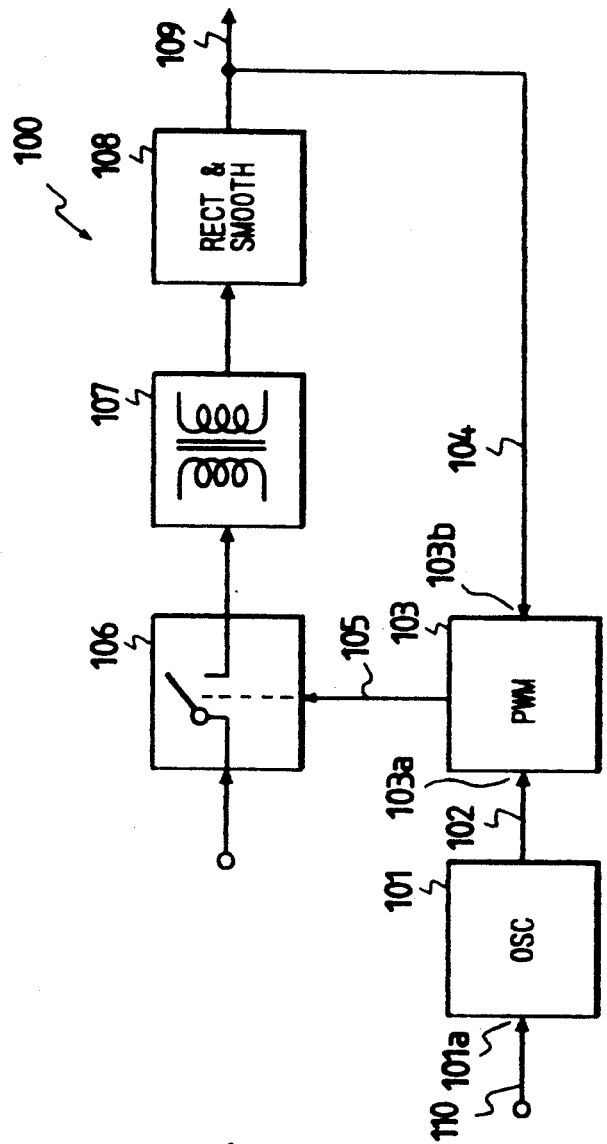
FIG. 4 is a block diagram of a prior art dc-dc converter.

FIG. 3 is a block diagram of the control circuit 7. The control circuit 7 comprises a leading edge detection circuit 21 for detecting a leading (falling) edge of the vertical synchronizing signal, a trailing edge detection circuit 22 for detecting a trailing (rising) edge of the vertical synchronizing signal, an OR gate 23 responsive to outputs of the leading and trailing edge detection circuits 21 and 22, and a pulse generator 24 responsive to an output of the OR gate 23. Either of the leading edge detection circuit 21 or the trailing edge detection circuit 22 can be omitted. The pulse generator 24 comprises a monostable multivibrator. However, if necessary, the pulse generator 24 comprises plural monostable multivibrators to produce a pulse train. Moreover, the control circuit 7 may alternatively comprise a shift register responsive to a relative high frequency clock signal for shifting the vertical synchronizing signal and a logic circuit. The logic circuit responsive to an output of plural stages of the shift register and the vertical synchronizing signal generates an output signal with a given pulse width, as shown in FIG. 2 as the oscillation stop signal 12.

In this embodiment, oscillation of the oscillation circuit 2 is stopped twice in response to the leading and trailing edge of the vertical synchronizing signal. However, the oscillation may be stopped at either of leading or trailing edge of the vertical signal, i.e., the oscillation can be stopped once in response to one vertical retrace line period. Moreover, the oscillation may be stopped at several times during a vertical retrace line period in response to the vertical synchronizing signal.

Hereinbelow will be described operation of the dc-dc converter with reference to a time chart shown in FIG. 2.

The control circuit 7 generates the oscillation stop signal 12 as shown in FIG. 2 in response to the leading and trailing edge of the vertical synchronizing signal 11 shown in FIG. 2. The oscillation stop signal 12 is applied to an oscillation stop input 2a of the oscillation circuit 2. As shown in FIG. 2, oscillation stops in response to the oscillation stop signal 12. When stop of oscillating, the output of the oscillation circuit 2 is H. Transition of the oscillation stop signal 12 from L to H starts oscillation. Therefore, transition of the oscillation circuit 2 from stop of oscillation to operation in response to the vertical synchronizing signal 11 synchronizes the square wave of the oscillation circuit 2 with the vertical synchronizing signal 11 essentially. Accordingly, this maintains the interleaving relation between the main frequency component of switching noise generated in response to the square wave signal 13 and the frequency of the horizontal scanning, so that beat trouble on the reproduced image is reduced.

More specifically, the oscillation operation of the self-excited oscillation circuit 2 is stopped at least once for a given short interval within one vertical retrace line period in phase with the vertical synchronizing signal 11 of the video signal. On the other hand, whether transition of the output of the self-excited oscillation circuit 2 at starting of oscillation is from H level to L level or L to H is determined by the structure of the self-excited oscillating circuit 2. Moreover, start-up time of oscillation essentially does not change in the same oscillation circuit 2. Therefore, though frequency stability of the self-excited oscillation circuit is low, its oscillation output essentially synchronizes with the vertical scanning period of the video signal. Thus, an interleaved relation is maintained between the main frequency component of noise generated by switching operation of the dc-dc converter 1 and the horizontal scanning frequency of the video signal, so that beat trouble on the reproduced image is reduced.

Further, as shown in the above-mentioned embodiment, resetting the self-excited oscillation circuit more than twice within one vertical retrace line period in response to the vertical synchronizing signal makes synchronization of oscillation stable without ripples on the output dc voltage even if a low cost LC type or RC type of self oscillation circuit is used in the dc converter.

As mentioned above, in the dc-dc converter of the invention, oscillation of the self-excited circuit is stopped at least once during one vertical retrace line period in response to the vertical synchronizing signal. Therefore, the oscillation output essentially synchronizes with the vertical scanning cycle of the video signal, so that the beat trouble on the reproduced image is reduced because the interleaved relation is maintained between the main frequency component of noise developed in response to switching of the primary circuit current of the transformer in the dc-dc converter and the horizontal scanning frequency of the video signal.

What is claimed is:

1. A dc-dc converter for converting first to second dc voltages, used for video apparatus, comprising:
   (a) a self-excited oscillation circuit for producing a clock signal, said self-excited oscillation circuit having a control input for controlling oscillation thereof in response to a control signal;
   (b) pulse width modulation means responsive to said clock signal and said second dc voltage for controlling duty ratio of said clock signal;
   (c) switching means responsive said pulse-width-modulated means for switching said first dc voltage;
   (d) rectifying and smoothing means for rectifying and then smoothing an output of said switching means to produce said second dc voltage; and
   (e) control means responsive to a vertical synchronizing signal of a video signal used in said video apparatus for producing said control signal whose pulse width is shorter than a vertical retrace period of said vertical synchronizing signal.

2. A dc-dc converter for video apparatus as claimed in claim 1, wherein said control means comprises an edge detection means for detecting an edge of said vertical synchronizing signal and a monostable multivibrator responsive to an output of said edge detection means for producing said control signal.

3. A dc-dc converter for video apparatus as claimed in claim 2, wherein said edge detection means comprises a first edge detector for detecting a leading edge of said vertical synchronizing signal and a second edge detector for detecting a trailing edge of said vertical synchronizing signal.

* * * * *